(12) United States Patent
Suwald et al.

(10) Patent No.: US 11,768,971 B2
(45) Date of Patent: Sep. 26, 2023

(54) TAMPER DETECTION DEVICE, SYSTEM, AND METHOD

(71) Applicant: NXP B.V., Eindhoven (NL)

(72) Inventors: Thomas Suwald, Hamburg (DE); Stefan Maier, Graz (AT)

(73) Assignee: NXP B.V., Eindhoven (NL)

( * ) Notice: Subject to any disclaimer, the term of this patent is extended or adjusted under 35 U.S.C. 154(b) by 496 days.

(21) Appl. No.: 17/022,299

(22) Filed: Sep. 16, 2020

(65) Prior Publication Data

US 2021/0110690 A1     Apr. 15, 2021

(30) Foreign Application Priority Data

Oct. 11, 2019   (EP) ..................................... 19202755

(51) Int. Cl.
  *G06F 21/86*     (2013.01)
  *B65D 55/02*     (2006.01)
  (Continued)

(52) U.S. Cl.
  CPC ........... *G06F 21/86* (2013.01); *B65D 55/028* (2013.01); *G01D 5/24* (2013.01); *G01R 27/2605* (2013.01);
  (Continued)

(58) Field of Classification Search
  CPC ... G06F 21/86; B65D 55/028; B65D 2401/00; G01D 5/24; G01R 27/2605;
  (Continued)

(56) References Cited

U.S. PATENT DOCUMENTS 5,237,307 A    8/1993  Gritton
10,372,283 B2  8/2019  Suwald
(Continued)

FOREIGN PATENT DOCUMENTS

DE    4232116 A1    3/1994
EP    2667156 B1    10/2015
(Continued)

OTHER PUBLICATIONS

Cermak, S. et al.; "Capacitive Sensor for Relative Angle Measurement;" Proceedings of the 17th IEEE Instrumentation and Measurement Technology Conference [Cat. No. 00CH37066]; May 1-4, 2000, Baltimore, Maryland; DOI: 10.1109/IMTC.2000.848850.
(Continued)

*Primary Examiner* — Joseph H Feild
*Assistant Examiner* — Sharmin Akhter

(57) ABSTRACT

It is described a tamper detection device for detecting tampering with respect to a packaging, the device comprising: i) a first electrode comprising a first patterned structure, and ii) a second electrode comprising a second patterned structure. The first electrode and the second electrode are arranged so that the first patterned structure and the second patterned structure are at least partially opposite to each other. In a first arrangement state of the first patterned structure and the second patterned structure with respect to
(Continued)

each other, a first capacitance is measurable, in a second arrangement state of the first patterned structure and the second patterned structure with respect to each other, a second capacitance is measurable, wherein the first capacitance is different from the second capacitance, and wherein the first arrangement state is different from the second arrangement state. The device further comprising: iii) a detection unit, wherein the detection unit is configured to: a) measure the capacitance between the first electrode and the second electrode, b) obtain, based on the measured capacitance, an information indicative of the arrangement state, and c) evaluate, based on the information indicative of the arrangement state, if a tampering with respect to the packaging is detected.

14 Claims, 10 Drawing Sheets

(51) Int. Cl.
  *G01D 5/24* (2006.01)
  *G01R 27/26* (2006.01)
  *G06K 19/07* (2006.01)
  *G08B 13/24* (2006.01)
  *H01G 5/04* (2006.01)
(52) U.S. Cl.
  CPC ..... *G06K 19/0716* (2013.01); *G08B 13/2468* (2013.01); *H01G 5/04* (2013.01); *B65D 2401/00* (2020.05)
(58) Field of Classification Search
  CPC ............ G06K 19/0716; G08B 13/2468; G08B 13/128; H01G 5/04
  See application file for complete search history.

(56) References Cited

U.S. PATENT DOCUMENTS

| | | | |
|---|---|---|---|
| 10,444,268 B2 | 10/2019 | Suwald | |
| 2010/0026313 A1* | 2/2010 | Bartley | ................. H01L 23/576 324/548 |
| 2014/0049507 A1* | 2/2014 | Shepelev | ............ G06F 3/04184 345/174 |
| 2015/0254961 A1* | 9/2015 | Brandl | ................. H04B 5/0037 340/663 |
| 2016/0084863 A1 | 3/2016 | Holmes et al. | |
| 2016/0234890 A1 | 8/2016 | De Samber et al. | |
| 2017/0068881 A1* | 3/2017 | Camper | ................. B32B 15/20 |

FOREIGN PATENT DOCUMENTS

| | | |
|---|---|---|
| EP | 3076136 A1 | 10/2016 |
| EP | 2717136 B1 | 7/2017 |

OTHER PUBLICATIONS

Gasulla, Manel et al.; "A Contactless Capacitive Angular-Position Sensor;" Published in Sensors, 2002 IEEE; Date of Conference Jun. 12-14, 2002, Orlando, Florida; DOI: 10.1109/ICSENS.2002. 1037224.

GCL Technologies, the Technological Research Center of Guala Closures Group; "GCG NXP Launch the First Fully Integrated Tamper Evident NFC Solution for Wines and Spirits;" Apr. 4, 2017; Italy; retrieved from the Internet: https://www.gualaclosures.com/gcg-nxp-launch-the-first-fully-integrated-tamper-evident-nfc-solution-for-wines-and-spirits-3/.

Sarwate, Dilip V. et al.; "Crosscorrelation Properties of Pseudorandom and Related Sequences;" Proceedings of the IEEE, vol. 68, Issue 5, May 1980; DOI: 10.1109/PROC.1980.11697.

* cited by examiner

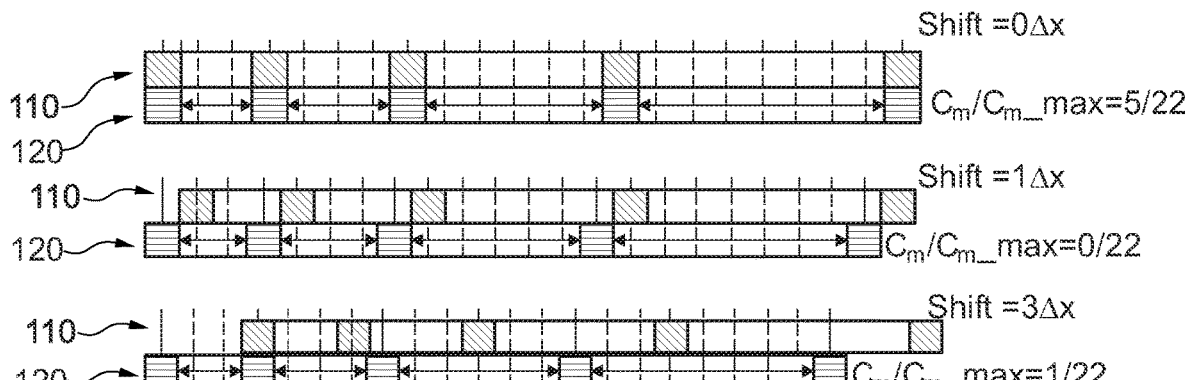
Fig. 21
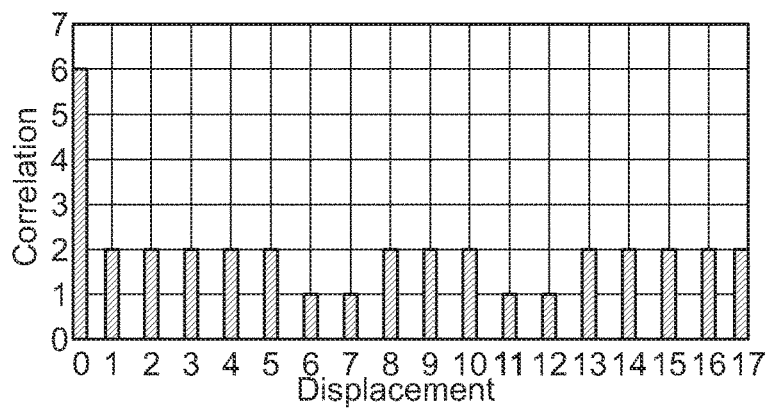
Fig. 22
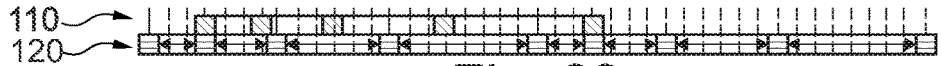
Fig. 23
| Gold Code | Ratio | Max_1 | Max_2 | Resolution | Coverage | Variation | Code Length |
|---|---|---|---|---|---|---|---|
| 10001001011 | 2.5 | 5 | 2 | 32° | 45% | 27% | 11 |
| 10001011011 | 2.0 | 6 | 3 | 32° | 55% | 27% | 11 |
| 1000000101001 | 4.0 | 4 | 1 | 27° | 31% | 23% | 13 |
| 100001010011011 | 2.3 | 7 | 3 | 24° | 47% | 27% | 15 |
| 100010011010111 | 2.0 | 8 | 4 | 24° | 53% | 27% | 15 |
| 10000101011100100 | 2.3 | 9 | 4 | 18° | 47% | 26% | 17 |
| 10000101011100110 | 2.0 | 10 | 5 | 18° | 53% | 26% | 17 |
| 100000000110010101 | 3.0 | 6 | 2 | 20° | 33% | 22% | 18 |
Fig. 24

TAMPER DETECTION DEVICE, SYSTEM, AND METHOD

CROSS-REFERENCE TO RELATED APPLICATIONS

This application claims priority under 35 U.S.C. § 119 to European Patent Application No. 19202755.5, filed on Oct. 11, 2019, the contents of which are incorporated by reference herein.

FIELD OF THE INVENTION

The invention relates to a tamper detection device for detecting tampering with respect to a packaging. The invention relates further to a tamper detection system that comprises the device. The invention relates also to a method of detecting tampering with respect to a packaging. Furthermore, the invention relates to a method of manufacturing the tamper detection device. The invention additionally refers to a use of the tamper detection device. Also, the invention relates to a product package that comprises the tamper detection device.

BACKGROUND OF THE INVENTION

Conventionally, mechanical protections like e.g. seals have been applied to secure packaging against tampering. A drawback of such seals is, that physical inspection is required to detect tampering. The application of electronic anti-tamper protections is conventionally either very costly or not very accurate and reliable. Providing an efficient tamper detection device or method in a cost-efficient manner remains a challenge.

OBJECT AND SUMMARY OF THE INVENTION

It is an object of the invention to enable tamper detection with respect to a packaging in an efficient (in particular cost-efficient) and robust manner.

In order to achieve the object defined above, a tamper detection device, a tamper detection arrangement, a manufacturing method, a use, and a product packaging according to the independent claims are provided.

According to an aspect of the invention, a tamper detection device for detecting tampering with respect to a packaging is described. The device comprises: i) first electrode comprising a first patterned structure, ii) a second electrode comprising a second patterned structure. The first electrode and the second electrode are arranged so that the first patterned structure and the second patterned structure are (at least partially) (arranged) opposite to each other (with a dielectric material and/or air in between). In a first arrangement state (e.g. an un-tampered state, in particular with a high level of correlation between the patterned structures) of the first patterned structure and the second patterned structure with respect to each other, a first capacitance is measurable (e.g. the capacitance is at its maximum or minimum, wherein maximum or minimum may include certain spread due to random effects and measurement errors), in a second arrangement state (e.g. a tampered state, in particular with a low level of correlation between the patterned structures) of the first patterned structure and the second patterned structure with respect to each other, a second capacitance is measurable (e.g. the capacitance is not at its maximum or minimum), wherein the first capacitance is different from the second capacitance, and wherein the first arrangement state is different from the second arrangement state (in particular the first measurable capacitance corresponds to the first arrangement state and the second measurable capacitance corresponds to the second arrangement state). The device further comprises iii) a detection unit (in particular comprising a capacitance measurement unit and a (capacitance) correlator) (connected to the first electrode and to the second electrode), wherein the detection unit is configured to: a) measure the capacitance (e.g. the first capacitance and/or the second capacitance) between the first electrode and the second electrode (in particular via terminals), b) obtain, based on the measured capacitance (Cm), an information indicative of the arrangement state (in particular obtain the first arrangement state or the second arrangement state), and c) evaluate (determine), based on the information indicative of the arrangement state, if a tampering with respect to the packaging is detected (e.g. obtaining the first arrangement state based on the first capacitance may lead to the determination of no tampering, while obtaining the second arrangement state based on the second capacitance may lead to the determination of a tampering).

According to a further aspect of the invention, a tamper detection system is described. The system comprising: i) a tamper detection device as described above, and ii) an external device. The device and the external device are configured to establish a communication (in particular a wireless communication) between each other.

According to a further aspect of the invention, a method of manufacturing a tamper detection device as discussed above is described. The method comprises: i) providing an electrically conductive preform (in particular a foil), ii) forming at least two electrodes from the electrically conductive preform, and iii) patterning the electrodes in order to provide respective patterned structures (on the electrodes). Hereby, the forming and/or the patterning comprises at least one of the group which consists of: applying and/or removing electrically conductive material to/from the preform, applying or removing dielectric material to/from the preform, embossing (at least partially) the preform.

According to a further aspect of the invention, a method for detecting tampering with respect to a packaging by a tamper detection device is described. The device has a first electrode comprising a first patterned structure and a second electrode comprising a second patterned structure. The method comprises: i) arranging the first electrode and the second electrode so that the first patterned structure and the second patterned structure are at least partially opposite to each other. Hereby, in a first arrangement state of the first patterned structure and the second patterned structure with respect to each other, a first capacitance is measurable; in a second arrangement state of the first patterned structure and the second patterned structure with respect to each other, a second capacitance is measurable; wherein the first capacitance is different from the second capacitance, and wherein the first arrangement state is different from the second arrangement state. The method further comprises ii) measuring the capacitance between the first electrode and the second electrode, iii) obtaining, based on the measured capacitance, an information indicative of the arrangement state, and iv) evaluating, based on the information indicative of the arrangement state, if a tampering with respect to the packaging is detected.

According to a further aspect of the invention, using a tamper detection device (see above) is described as at least one of the group consisting of: a security seal, a device protection, an access control to a function or service, a ticket, a pressure sensor.

According to a further aspect of the invention, a product packaging is described that comprises a tamper detection device as discussed above.

In the context of the present application, a capacitance of a capacitor constructed of two (essentially) opposite (parallel) electrodes (plates), both of area A and separated from each other by a distance d, may be expressed as: $C=\varepsilon_r \varepsilon_0 A/d$. Thereby, $\varepsilon_r$ is the relative static permittivity (sometimes called the dielectric constant) of the material (or air) between the two electrode plates (for a vacuum, $\varepsilon_r=1$) and $\varepsilon_0$ is the dielectric constant or vacuum permittivity ($=8.854\times 10^{-12}$ As/Vm). From the formula one can take that the capacitance is proportional to the area of the overlap between the electrodes.

In the context of the present application, the term "electrode" may refer in particular to an electrical conductor. In an embodiment, the electrode may be formed as a plate with a patterned structure on at least one of its two main surfaces. The electrode may be contacted by a terminal. The electrode may further comprise two or more electrode parts. The material of the electrode may comprise for example one of Ag, Al, Au, Be, Cr, Cu, Fe, In, Mg, Mo, Ni, Pb, Pd, Pt, Rh, Sb, Sn, Ti, Zn, as well as an alloy comprising at least one of these elements.

In the context of the present application, the term "patterned structure" may in particular refer to a region of an electrode that comprises a patterned structure (e.g. on the surface of an electrode plate). An electrode may be at least partially patterned e.g. by electrically conductive plates and/or holes. A patterned structure may e.g. comprise spatially separated parts of electrically conductive material patterns on an electrically conductive substrate or a dielectric substrate. A patterned structure may also comprise spatially separated parts of dielectric material patterns on an electrically conductive substrate or a dielectric substrate. The pattern may for example be a highly complex pattern, e.g. a Gold code pattern. The patterned structure in the present context may also be a definition of the positioning sequence of material patterns (e.g. plates and holes) formed on/in electrodes.

In the context of the present application, the term "correlation" may refer to a measure of how well two patterns (in particular patterned structures of electrodes) match (fit) to each other. For example, when the electrically conductive patterns of a first patterned structure and the electrically conductive patterns of a second patterned structure are equal, the correlation would be (essentially) perfect. If the patterns are very similar and match very good, then a high level correlation (in other words a high level similarity or matching) would be obtained. Correlation may also be expressed by a quality criterion. For example, a good correlation may fulfill a certain correlation quality criterion. On the other hand, if the patterns are not very similar (no matching), then a low level correlation would be obtained. In this case, the correlation between the patterns may not fulfill a certain quality criterion. The first patterned structure and the second patterned structure may be configured to correlate (in particular correlate on a high level and/or fulfill a correlation quality criterion) with each other in a first arrangement state (e.g. an un-tampered state) of the first patterned structure and the second patterned structure (arranged at least partially opposite to each other), and the first patterned structure and the second patterned structure may be configured not to correlate (in particular correlate on a low level and/or not fulfill a correlation quality criterion) with each other in a second arrangement state (e.g. a tampered state) of the first patterned structure and the second patterned structure (arranged at least partially opposite to each other). The term "auto-correlation" may refer to a measure for similarity of practically identical patterns being displaced by displacement and/or rotation.

In the context of the present application, the term "arrangement state" may refer to a specific arrangement between the first electrode and the second electrode, in particular between the first patterned structure and the second patterned structure with respect to each other. For example, in a first arrangement state, the patterned structures may be arranged opposite to each other such that the patterns correlate with each other on a high level (e.g. electrically conductive patterns match and dielectric patterns match). Hereby, the capacitance between the electrodes may be at its maximum or minimum value, wherein maximum or minimum may include certain spread due to random effects and measurement errors. In a second arrangement state, for example, the patterned structures may be arranged opposite to each other such that the patterns do not correlate with each other on a high level (e.g. electrically conductive patterns do not match and dielectric patterns do not match). Hereby, the capacitance between the electrodes may not be at its maximum or minimum value. Both arrangement states may be well distinguishable by measuring the capacitance (a first capacitance and a second capacitance), because a change in the correlation (by changing the arrangement state) may also change the capacitance (capacitance variation).

In the context of the present application, the term "packaging" may refer to any material that could be used to pack (provide a packaging for) a product. A packaging may be some kind of paper that could be wrapped around a product. A packaging could also be a bottle and/or a bottle closure. A packaging may also be a package of an electronic component (e.g. for a die).

In the context of the present application, the term "tampering" may refer to an, in particular undesired, influence with respect to a packaging as described above. For example, a bottle closure may (at least partially) be opened or said bottle closure may not be fixed to the bottle as desired. While some tampering may be directly observable, there exist many kinds of tampering that have to be measured/detected, because they are not directly observable, in particular in the context of high amounts of packaging.

According to an exemplary embodiment, the invention may be based on the idea that tamper detection with respect to a packaging can be enabled in an efficient and robust manner, when the capacitance between specifically patterned structures of electrodes is measured and an information indicative of an arrangement state between the patterned structures is then obtained. Hereby, the obtained arrangement state is based on the correlation between the electrode patterns that is directly reflected by the measured capacitance. Hereby, the capacitance may be at its maximum/minimum in an un-tampered first pattern arrangement and not be at said maximum/minimum in a tampered second pattern arrangement. Thus, the obtained arrangement state can be used to detect a tampering. In other words, a displacement induced capacitance variation is applied to detect a tampering.

In the following, further exemplary embodiments of the method and the communication system will be explained.

According to an exemplary embodiment, the information indicative of the arrangement state (in particular the first arrangement state or the second arrangement state) is based on a capacitance variation (in particular between the first capacitance and the second capacitance) caused by a displacement and/or a rotation of the electrodes (in particular the patterned structures) with respect to each other. This may provide the advantage that tampering detection can be performed very efficiently and accurately. Even small movements regarding a packaging may displace and/or rotate one electrode, in particular one patterned structure, with respect to the other electrode (patterned structure). Said displacement/rotation may dislocate the electrically conductive parts and the dielectric parts of the patterned structures with respect to each other and thereby cause a capacitance variation, in particular a (significant) change in the measured capacitance.

According to a further exemplary embodiment, tampering is not detected, when the first patterned structure and the second patterned structure are in the first arrangement state, wherein a high level of correlation is obtained, and tampering is detected, when the first patterned structure and the second patterned structure are in the second arrangement state, wherein a low level of correlation is obtained. This may provide the advantage that tampering can be detected in an accurate and straightforward manner. The first arrangement state, wherein the patterned structure correlate with each other, may be seen as the un-tampered, initial state. The capacitance may be at its maximum in this state. A tampering action may dislocate the patterned structures (to the second arrangement state) and then, the capacitance is not at its maximum anymore. In an example, the patterned structures are hereby electrically conductive material patterns.

According to a further exemplary embodiment, the measured capacitance is at its maximum or at its minimum in the first arrangement state, and the measured capacitance is not at its maximum or at its minimum in the second arrangement state.

The described embodiment may also be applied in an inverse manner Hereby, the capacitance may be at its minimum in an un-tampered state (first arrangement state) and, upon a tampering action and dislocation of the patterned structures from each other (second arrangement state), the capacitance is not at its minimum anymore.

In an embodiment, inverse correlation may be applied, e.g. correlating a first electrode pattern with a second electrode pattern by matching electrodes formed as plates with holes therein and vice versa such that the capacitance is minimal at un-tampered electrode placement, and wherein the capacitance may have a maximum at tampered electrode placement. Hence, larger than minimum capacitance may be an indication for displaced electrodes in tampered state. The capacitance variation may be measured relative to the maximum capacitance or minimum capacitance in tampered state, which may be useful if the electrode distance may be kept constant during correlation but may face significant manufacturing spread.

According to a further exemplary embodiment, the first patterned structure and the second patterned structure are (essentially) equal (identical). This may provide the advantage that a high capacitance maximum (or minimum) can be established for the un-tampered state, which could be easily distinguished from a tampered state. This may render the tamper detection more accurate.

According to a further exemplary embodiment, the first patterned structure and/or the second patterned structure comprises a highly complex pattern, in particular a Gold code pattern. This may provide the advantage that a very high accuracy for the tamper detection can be achieved.

In the following, advantageous design of the electrodes (and electrode patterned structures) will be described:

According to a further exemplary embodiment, the first electrode and/or the second electrode comprises a plurality of spatially separated electrically conductive (material) patterns.

According to a further exemplary embodiment, the first electrode and/or the second electrode comprises a plurality of spatially separated dielectric (material) patterns.

According to a further exemplary embodiment, the first electrode and/or the second electrode comprises a plurality of spatially separated electrically conductive (material) patterns on a dielectric substrate, and/or a plurality of spatially separated dielectric (material) patterns on an electrically conductive substrate.

According to a further exemplary embodiment, the first electrode and/or the second electrode comprises a plurality of spatially separated electrically conductive patterns on an electrically conductive substrate.

According to a further exemplary embodiment, the first electrode and/or the second electrode comprises a plurality of spatially separated electrically conductive patterns formed as embossed structures on an electrically conductive substrate.

The electrodes may be structured on a conductive substrate by e.g. applying areas of dielectric material having a permittivity significantly larger than 1 (free air), thus forming areas of increased capacitance, that may be regarded as plates. Electrodes may furthermore be separated by additional dielectric layers. This embodiment may have the advantage, that areas of printed dielectrics can act as spacers between the electrodes. In combination with a force applied to on one electrode towards the other electrode, the distance $d_{air}$ may be minimized, thus maximizing capacitance Cm.

The first electrode may be structured by areas of conductive material forming plates on dielectric material and being electrically coupled to each other, while the second electrode may be structured on a conductive substrate by applying areas of dielectric material (e.g. by printing) having a permittivity significantly larger than 1, which may thus form areas of increased capacitance, that may also be regarded as plates. The electrodes may furthermore be separated by additional dielectric layers.

Electrically conductive material may comprise for example metal such as copper or aluminum, but also e.g. conductive polymers or carbon. Dielectric material may comprise all kinds of dielectric material, for example PCB materials such as FR4.

According to a further exemplary embodiment, i) the first electrode comprises a first electrode part and a second electrode part, wherein the first electrode part and the second electrode part are interconnected, ii) the second electrode comprises a third electrode part connected to a first terminal and a fourth electrode part connected to a second terminal, iii) the first electrode part is arranged essentially opposite to the third electrode part, iv) the second electrode part is arranged essentially opposite to the fourth electrode part, and v) the device is configured so that a packaging is placeable between the first electrode and the second electrode, while both terminals are accessible from one side of the packaging. This may provide the advantage that the tampering detection can be applied in a very flexible manner, in particular even complicate structures such as bottle closures can be efficiently contacted from just one side.

The described "floating" patterned electrode (two or more electrode parts) may enable capacitance sensing from a single interconnection plane which may be completely located inside of a packaging. In particular this configuration reduces integration cost significantly.

According to a further exemplary embodiment, the third electrode part comprises an outer electrode part, the fourth electrode part comprises an inner electrode part, and the outer electrode part surrounds the inner electrode part. This may provide the advantage that the device can be realized with an efficient and robust design. The inner and/or the outer part may be realized as discs, in particular metal discs.

According to a further exemplary embodiment, the tamper detection device further comprises: a communication unit coupled to the detection unit, wherein the communication unit is configured to i) communicate (in particular in a wireless manner) with an external device, and ii) send a detection result to the external device (upon request). This may provide the advantage that the tampering result can be obtained in a feasible and flexible manner.

According to a further exemplary embodiment of the tamper detection system, the wireless communication is at least one of the group consisting of NFC, Bluetooth, RFID, WiFi, Zigbee. This may provide the advantage that established industry standards can be directly implemented to efficiently obtain the tamper detection result.

According to a further exemplary embodiment of the tamper detection system, the external device is configured for wirelessly supplying the tamper detection device with energy. This may provide the advantage that the tamper detection device does not need its own energy source (such as a battery) and can hence be applied more flexible and cost-efficient.

According to a further exemplary embodiment of the tamper detection system, the external device is configured to request the tampering detection result from the device. This may provide the advantage that tampering can be tested and evaluated in a flexible manner, also on large scales with many product packagings.

According to a further exemplary embodiment, the method further comprises: i) generating a Gold code, and ii) patterning the first electrode and/or the second electrode so that the pattern of the first patterned structure and/or the pattern of the second patterned structure comprises the Gold code.

Generating a Gold code may comprise the steps of: i) define code length as function of required solution, ii) define number of correlation positions providing high capacitance at authentic placement, and iii) search for codes with minimal peak level at non-authentic placements. Selection criteria may be the required resolution as it basically defines the code's bit-length. Next, the number of correlation positions representing high capacitance areas that contribute to the measured capacitance (Cm) may be defined. Finally, it may be beneficial to select codes, that meet the previously defined requirements and moreover, show minimal peak levels at tampered placements and moreover, exhibit minimum ripple in tampered state.

The aspects defined above and further aspects of the invention are apparent from the examples of embodiment to be described hereinafter and are explained with reference to these examples of embodiment. The invention will be described in more detail hereinafter with reference to examples of embodiment but to which the invention is not limited.

BRIEF DESCRIPTION OF THE DRAWINGS

FIGS. 21 to 32 illustrate implementations of capacitance variance measurements according to exemplary embodiments of the invention.

The illustrations in the drawings are schematic. In different drawings, similar or identical elements are provided with the same reference signs.

DESCRIPTION OF EMBODIMENTS

Figure 1:
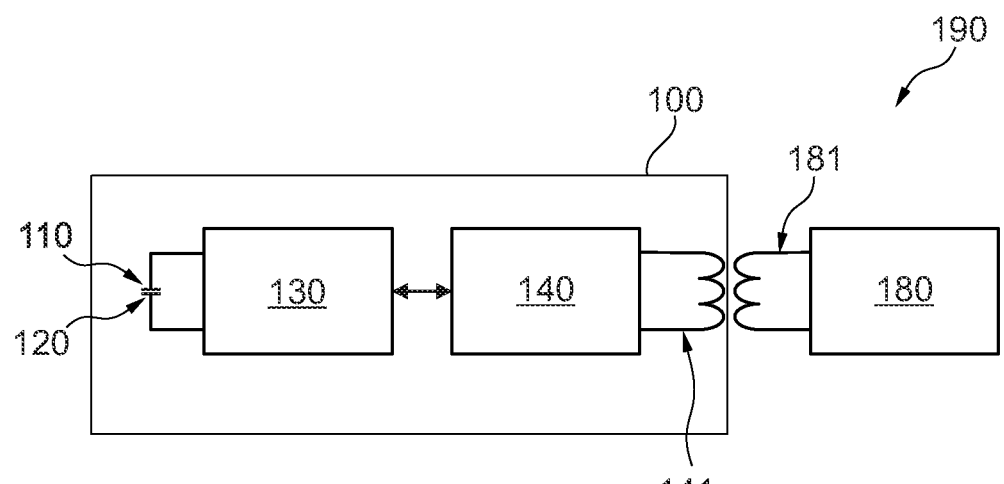
FIG. 1 illustrates a tamper detection system according to an exemplary embodiment of the invention.

Before referring to the drawings, exemplary embodiments will be described in further detail, some basic considerations will be summarized based on which exemplary embodiments of the invention have been developed.

According to an exemplary embodiment of the invention, a method and a device are disclosed for securing a packaging against tampering by means of sensing specifically patterned electrodes coupled to the packaging. The electrodes are patterned by a highly complex structure such as a Gold code and tampering is sensed by evaluating (the quality of) correlation between patterned structures of the electrodes (using e.g. a capacitive correlator), wherein only an untampered arrangement state will provide a detectable high level correlation. As a secondary feature, the method may be applied to grant access to a function or service if the (Gold code) patterns of two electrode patterned structures match. The capacitance developing between the patterned structures of the electrodes may be very small, and the change in capacitance caused by displacement of the electrodes with respect to each other may be even smaller. However, the method as disclosed here provides a significantly large displacement induced capacitance variation. Preferred embodiments include dielectric material with high permittivity applied to a conductive substrate such as aluminum foil or embossing metal sheets or foils. Benefits of these methods are compatibility with packaging manufacturers tooling, thus avoiding specific tool investments, and shielding of the sensing capacitor against electromagnetic coupling of unwanted noise components. According to an example, energy is provided by an external device (host device) through electromagnetic coupling, and the detected placement status is communicated wirelessly to the external device. A capacitance measurement unit can be configured to attenuate coupled electromagnetic radiation components. The described tamper detection device recognizes tampering of a packaging and communicates the recognized tampering condition wirelessly to a data processing unit of the external device.

According to a further exemplary embodiment of the invention, the following features may be provided: i) tampering is detected by determining the (capacitance) variation in high level (auto-) correlation of at least two hardware-encoded Gold codes being fixed to a product packaging between an un-tampered and a tampered state, ii) hardware-encoding is achieved by structuring electrodes forming a capacitor by Gold code patterns showing strong auto-correlation, iii) a capacitive correlator is applied to measure correlation between at least two patterned electrodes, iv) alternatively, inverse correlation provides minimum correlation if a Gold code is correlated with the inverse of the same Gold code, v) the tamper detection device (token) communicates wirelessly with an external device (host unit), enabling automated tamper testing, vi) the host unit supplies energy wirelessly to the device, hence no battery is required, vii) a patterned floating electrode enables capacitance measurement from a single interconnection plane, which is required if one patterned capacitor electrode may reside in a separated part of the packaging not reachable by interconnection, viii) an electrode is formed by structuring a Gold code on a conductive substrate by application or removal of dielectric material having large permittivity, wherein the conductive substrate is also intended to provide shielding against electromagnetic (EM) radiation (Faraday cage function), and the electrode may be structured by printing which utilizes existing tooling, ix) an electrode is formed by structuring a Gold code on a conductive substrate by application or removal of conductive material or by embossing (reforming) the conductive substrate, wherein the conductive substrate is also intended to provide shielding against EM radiation (Faraday cage function), and the electrode may be structured by printing which utilizes existing tooling, and x) a capacitive voltage divider attenuates EM radiation without affecting the correlation result.

According to a further exemplary embodiment of the invention, a contactless token (device) is described, having a capacitive correlator for detecting displacement from an authentic position (e.g. a first arrangement state). High-level correlation of patterned structures to provide increased relative capacitance at improved linear/angular resolution. A displacement is hereby measured via capacitance variation and not via an absolute position. A specific correlation pattern is herefore utilized. A correlator is applied to measure correlation of at least two electrodes being patterned with the same Gold code. A capacitance correlator outputs maximum level at an un-tampered position (e.g. the first arrangement state). The electrodes can be randomly shaped and positioned. In general, the tamper protection method disclosed here supports many low-cost use cases, where at least two parts of an un-tampered packaging must match to indicate un-tampered state, or where access to a function or a service shall be restricted to availability of a token carrying an encoded key or to a time period if the encoded key is configured to fade out over time or as a consequence of a chemical or mechanical process being applied.

According to a further exemplary embodiment of the invention, a generic capacitive correlator comprising a first electrode and at least an opposing second electrode that may form the tamper-dependent capacitance (Cm), wherein at least two electrodes can be each formed on separate planes comprising arbitrarily positioned and shaped areas that provide inside of said areas higher relative capacitance than outside of said areas. The areas of relative higher capacitance shall form plates, whereas the areas of relative lower or no capacitance shall form holes. On each electrode, said plates and said holes not having zero capacitance may be electrically coupled. All conductive parts of the first electrode may be insulated from all conductive parts of the at least second electrode, thus forming capacitance Cm. The first electrode and at least the second electrode may have the plates and holes formed and positioned such, that the capacitance developing between said electrodes has a detectable maximum or minimum in un-tampered state and deviates significantly from that capacitance in tampered state. This may mean, that the pattern formed by shaping and positioning the electrodes may exhibit strong correlation or strong inverse correlation in un-tampered state while correlation is poor in tampered state. Strong correlation in this context may mean maximum capacitance of Cm in un-tampered state at a fixed electrode distance if plates are correlated with plates and holes with holes, or strong inverse correlation shall mean minimum capacitance of Cm in un-tampered state at a fixed electrode distance if plates are correlated with holes and holes with plates (inverse electrode patterns). For good correlator performance it may be required to maximize the displacement induced variation of capacitance Cm per area, which may be achieved if in case of maximum capacitance in un-tampered state, the pattern applied by shaping and positioning plates and holes is for the correlated electrodes practically made identical, or in case of minimum capacitance in un-tampered state, the pattern applied by shaping and positioning plates and holes to a first electrode is inversely applied to at least a second correlated electrode by replacing plates by holes and vice versa.

According to a further exemplary embodiment of the invention, capacitance Cm develops between two electrodes A and B. The variation in correlation $\alpha_r$ may be expressed by the ratio of capacitance variation $\Delta Cm$ to maximum capacitance $Cm_{max}$: $\alpha_r = \Delta Cm/(\max(Cm))$. The capacitance variation of Cm shall comply with the resolution of capacitance measurement while the maximum capacitance of Cm shall comply with the capacitance measurement range.

According to a further exemplary embodiment of the invention, the capacitance correlator may be integrated into a bottle closure as an additional security feature supplementing a mechanical tamper protection and thus adding an option to automatically check its tamper state. Such closures comprise two mechanical parts: an inner closure with e.g. thread to match a thread of a bottle, and an outer closure. When opening such closure, the outer closure is first rotated relative to the inner closure. After being rotated by a small angle of e.g. 25°, the outer closure must overcome a rotation barrier. The rotation barrier can only be passed in the direction required to open the bottle, and once passed the outer closure may not be rotated before the rotation barrier. From an angle of e.g. 35° onwards, the outer closure couples force to the inner closure, and thus the bottle may be opened. The tamper detection token disclosed here shall now detect whether the outer closure has been turned by more than 25° and has passed the rotation barrier. This means, rotation of the outer closure relative to the inner closure by more than 25° shall mean tampering and this must be detected. The challenges for this application are:

i) Available space for a protection device between outer closure and inner closure is ≤25 mm in diameter and ≤3 mm in height, meaning the capacitance variation of Cm from un-tampered position to tampered position is less than 1 pF;
ii) The protection needs to be split into two parts: a) An inlay comprising a loop antenna, a first correlator electrode and the correlator device with NFC communication unit, and mounted to the top of the outside of the inner closure, b) A second correlator electrode mounted to the inside of the outer closure below its top, leaving space for integration of the protection token between the outer closure and the inner closure;

iii) The first correlator electrode is structured by metal (Cu) on dielectric (FR4), the second correlator electrode is structured by dielectric on conductive substrate, wherein the conductive substrate may be a conductive polymer or aluminum foil;

iv) The air gap between the two electrodes may be ≥100 μm;

v) A mobile device may be couple with the NFC interface to read out tampering state. The mobile device may inject EM radiation into the capacitive correlator. Therefore, structuring the second electrode by a dielectric code pattern on conductive substrate may shield against EM radiation;

vi) The CMU has a resolution of ≈250 fF; and vii) Angular resolution is ≈20°, thus a Gold code with a bit length of 12-18 bits may be suitable.

According to a further exemplary embodiment of the invention, the described method is applied to provide low-cost protection to a device that requires an attachable authentic component. For that reason, the device carries a first correlation electrode, a capacitance correlator and a communication unit, while the attachable component carries a second correlation electrode. When the electrode patterns of both electrodes match, a function or service of the device is enabled, wherein the protection may be designed to stop the function or service after some time has elapsed.

According to a further exemplary embodiment of the invention, wear of an authentic component being coupled to a device may be detected at low cost. Therefore, a device carries a first correlation electrode, a capacitance correlator and a communication unit, while a coupled component facing wear carries a second correlation electrode. When the electrode patterns of both electrodes match, a function or service of the device is enabled, when the correlation degrades, wear of the attached component is indicated to the device that triggers related reaction. If the second correlation electrode may interact by means of a chemical process with its environment, it may disappear after some processing time, thus providing a time constant being linked to the chemical process, type and concentration of the involved chemical reagents and environmental process parameters like temperature, humidity or pressure. A component with non-authentic coding being coupled to the device may cause the device to immediately take a related action.

According to a further exemplary embodiment of the invention, access to a service provided by a device may be restricted to a group of persons having a matching access token (device). The device may carry a first encoded electrode, a capacitance correlator and the components required to provide the service, while the token may carry the second encoded electrode. Only if the encoding of the first and the second electrode show strong correlation when being coupled, access to the service is granted. The token may e.g. be a low-cost ticket providing a conductive area where the encoding can be printed to at ticket issuance. Thus, different encodings may be applied that may match different device encodings, thus granting access to different services. For improved selectivity, the encodings shall provide enough entropy or shall be designed to provide strong cross-correlation with different dedicated encodings. This application may provide supplemental access control next to the control provided by e.g. an NFC based access control mechanism. Due to its low cost, this method may be applied for product marketing related activities like customer relationship management.

According to a further exemplary embodiment of the invention, access to a service provided by a device may be restricted to a group of persons having a matching access token (device). The device may carry a first encoded electrode, the correlator and the components required to provide the service, while the token may carry the second encoded electrode. Only if the encoding of the first and the second electrode show strong correlation when being coupled, access to the service is granted. The token may e.g. be a low-cost ticket providing a conductive area carrying a code pattern. The code pattern may be invalidated at ticket issuance by e.g. a mechanical process that removes the auto-correlation properties of the code pattern. Thus, access to a function or service may be revoked at ticket issuance. If the ticket carries various codes, access to various functions/codes may be revoked.

According to a further exemplary embodiment of the invention, the described correlative tamper protection mechanism is applied to a sticker or a banderole which is used for sealing purposes. A device, e.g.: any kind of package or bottle, may carry one correlation electrode, a capacitor correlator and a communication unit, whereas the second correlation electrode is included in the seal. The second electrode can utilize any conductive area from the seal, or a conductive material of simple geometry can be applied to the seal. The correlative pattern is applied using dielectric glue in dots or stripes, which is also used to apply the seal to the device, where areas with glue between the conductive plates are areas of high capacity. Removing the seal results in losing the adhesive function of the glue, thus changing the correlation between the electrodes resulting in a detectable change of capacitance. No galvanic connection to the second electrode is needed, thus the ease of production results in cost efficient two factor tamper protection (replacing the seal to its original position never results in the original auto correlation between the electrodes, because the glue pattern is already destroyed).

FIG. 1 illustrates a tamper detection system 190 according to an exemplary embodiment of the invention. The tamper detection system 190 comprises a tamper detection device 100 and an external device 180. The device 100 comprises a first electrode 110 and a second electrode 120 arranged opposite to each other with an insulator (e.g. air) in between, thereby forming a capacitor. The device 100 further comprises a detection unit 130 configured to i) measure a capacitance between the first electrode 110 and the second electrode 120, to ii) obtain, based on the measured capacitance, an information indicative of the arrangement state (between the electrodes), and to iii) evaluate, based on the information indicative of the arrangement state, if a tampering with respect to a packaging is detected or not. In other words, a tamper dependent capacitance Cm is measured between the electrodes 110, 120 being attached to a packaging (not shown). Displacement of said electrodes 110, 120 with respect to each other can indicate tampering. The deviation of the tamper dependent capacitance from an un-tampered reference value is hence utilized as a measure for tampering detection. The device 100 further comprises a communication unit 140 coupled to the detection unit 130. The device 100 and the external device 180 are configured to establish a wireless communication (e.g. NFC, Bluetooth, RFID) with each other via a first loop antenna 141 of the device 100 and a second loop antenna 181 of the external device 180. The external device 180 is additionally configured for wirelessly supplying the tamper detection device 100 with energy and to request the tampering detection result from the device 100.

Figure 2:
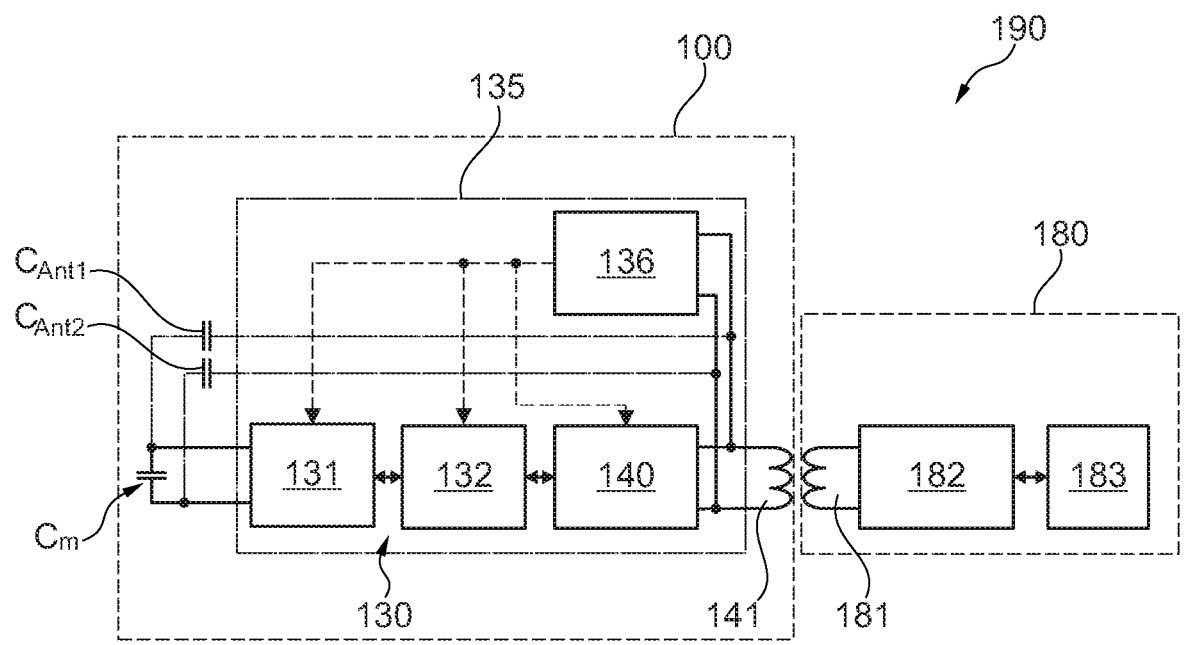
FIG. 2 illustrates a tamper detection system according to a further exemplary embodiment of the invention.

FIG. 2 illustrates a more detailed example of the tamper detection system 190 according to an exemplary embodiment of the invention. The device 100 comprises a position correlation module 135 that has the detection unit 130, the communication unit (e.g. NFC unit) 140 and a power conditioning unit 136, which can organize energy supply (energy harvesting) by the external device 180. The detection unit 130 comprises a capacitance measurement unit 131 and a (shift/rotation) correlation unit 132. The external device 180 comprises a communication interface 182 and a data processing unit 183. The electromagnetic field of the second loop antenna 181 can hereby interfere with the capacitance measurement by means of schematically indicated coupling capacitances $C_{Ant1}$ and $C_{Ant2}$ (see also FIGS. 40 to 43 below).

FIGS. 3 to 7 illustrate basic concepts of a tamper detection device according to exemplary embodiments of the invention.

Figure 3:
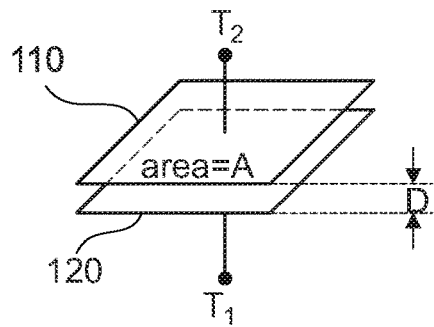
FIGS. 3 to 7 illustrate basic concepts of a tamper detection device according to exemplary embodiments of the invention.

FIG. 3 illustrates an example of the electrodes 110 and 120 arranged opposite to each other in form of a capacitor with the distance D in between and the electrode area A. Each electrode 110, 120 is contacted by a terminal T1, T2.

Figure 4:
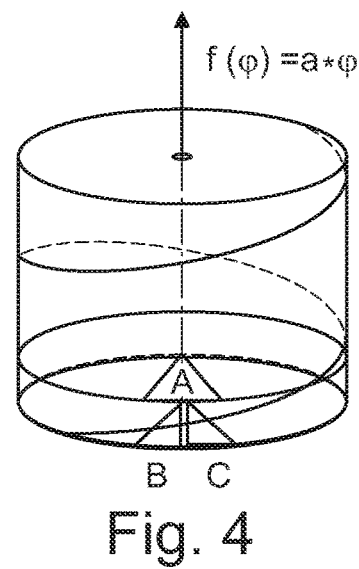

FIG. 4 illustrates an example according to which, in case of rotation, the measured capacitance Cm may be periodic with 360° (2π). Such a periodicity of Cm may be removed by application of a concurrent rotation dependent variation of the plate (electrode) distance d=f(φ), which may degrade capacitance Cm at ambiguous rotation angles by 1/f(φ). A displacement along the rotation axis depending on the angular displacement Δφ may e.g. be achieved by a thread as this may remove position ambiguity. It can be an advantage to choose function f(φ) such that the capacitance variation between an un-tampered position and any rotated ambiguous position may not be larger than the capacitance variation between the un-tampered position and any unambiguous rotated position.

Figure 5:
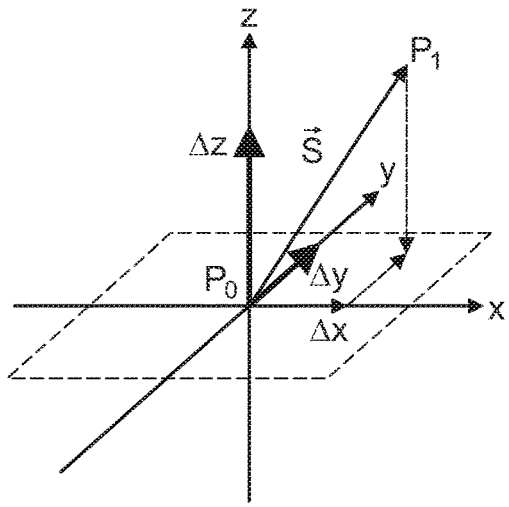

FIG. 5 illustrates an example of displacement and/or rotation in three-dimensional space that may provide a capacitance variation that is indicative for tampering of a packaging. Such displacement may comprise displacement from an authentic(un-tampered) position P0 to a tampered position P1 by displacement Δx in x-direction, by Δy in y-direction, and/or by Δz in z-direction, or by rotation of angle Δφ, or any combinations thereof.

Figure 6:
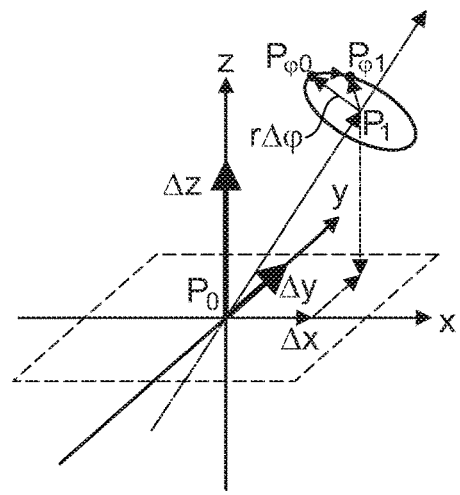

FIG. 6 illustrates an example, where the displacements Δx, Δy, and Δz may define position P1 and furthermore may define a rotation axis through origin P0 and position P1. The displacement from position Pφ0 to position Pφ1 may be the result of rotating the plane being perpendicular to said rotation axis by angular displacement Δφ.

Figure 7:
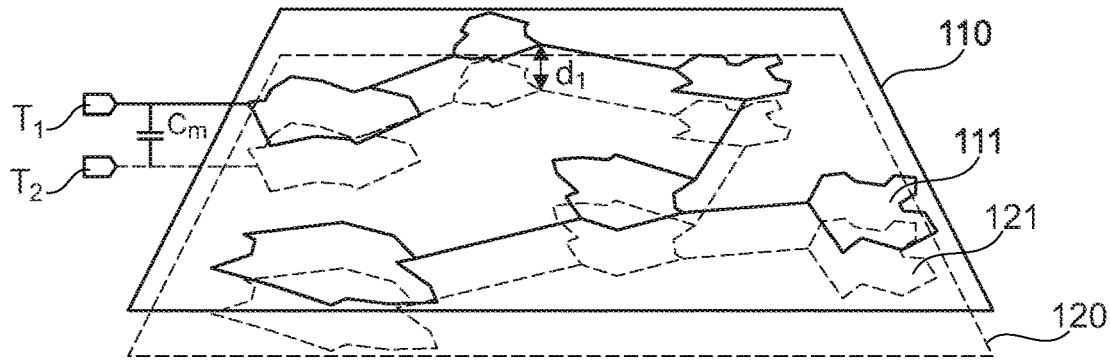

FIG. 7 illustrates the first patterned structure 111 and the second patterned structure 121 according to an exemplary embodiment of the invention. The first electrode 110 and the second electrode 120 are arranged so that the first patterned structure 111 and the second patterned structure 121 are opposite to each other. The patterned structures 111, 121 are realized as spatially separated electrically conductive plates arranged in a common plane. In this example, the first patterned structure 111 and the second patterned structure 121 correlate with each other (essentially) perfectly, hence there is a high-level correlation (also termed auto-correlation). This arrangement can be termed first arrangement state (e.g. un-tampered state) and the capacitance can be at its maximum in this state.

FIGS. 8 to 13 illustrate dislocation of one electrode with respect to the other electrode according to exemplary embodiments of the invention.

Figure 8:
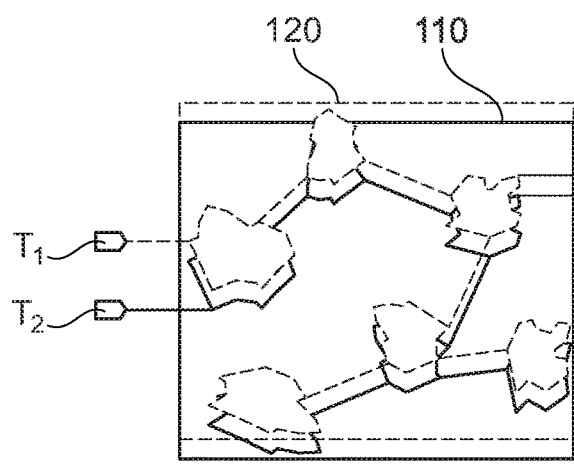
FIGS. 8 to 13 illustrate dislocation of one electrode with respect to the other electrode according to exemplary embodiments of the invention.

FIG. 8 illustrates the second electrode 120 being displaced relative to the first electrode 110 by a small displacement Δy1 in y-direction.

Figure 9:
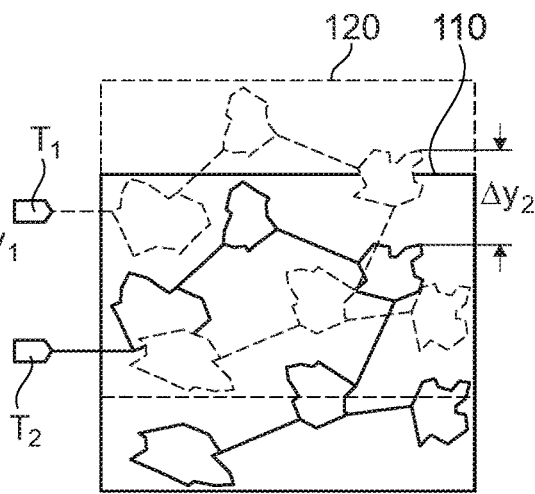

FIG. 9 illustrates the second electrode 120 being displaced relative to the first electrode 110 by a larger displacement Δy2 in y-direction. The capacitance Cm developing between the first electrode 110 and the second electrode 120 is significantly smaller in the arrangement (state) shown by FIG. 9 when compared to the arrangement (state) shown by FIG. 8.

Figure 10:
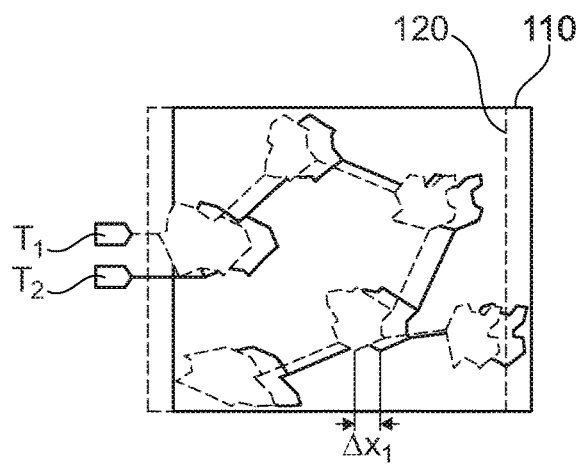

FIG. 10 illustrates the second electrode 120 being displaced relative to the first electrode 110 by a small displacement Δx1 in x-direction.

Figure 11:
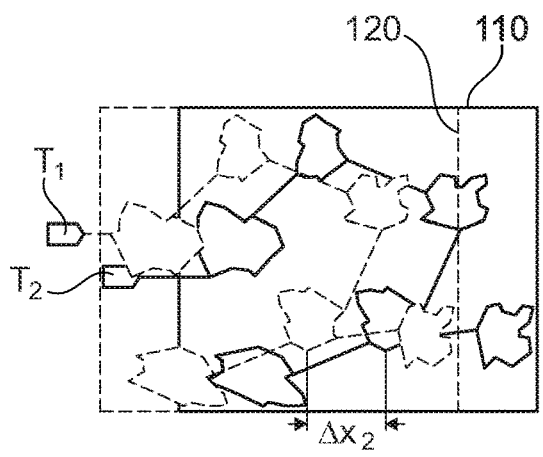

FIG. 11 illustrates the second electrode 120 being displaced relative to the first electrode 110 by a larger displacement Δx2 in x-direction. The capacitance Cm developing between the first electrode 110 and the second electrode 120 is significantly smaller in the arrangement (state) shown by FIG. 11 when compared to the arrangement (state) shown by FIG. 10. If shape and positioning of the conductive areas is random, the capacitance Cm at their un-tampered position P0/Pφ0 and displaced position P1/Pφ1 may be expressed by e.g. Gaussian distributions, defined by mean value and spread. The spreads of these distributions may be narrowed, if the randomness of shape and positioning of the conductive areas as well as the complexity of the displacement operation may be restricted.

Figure 12:
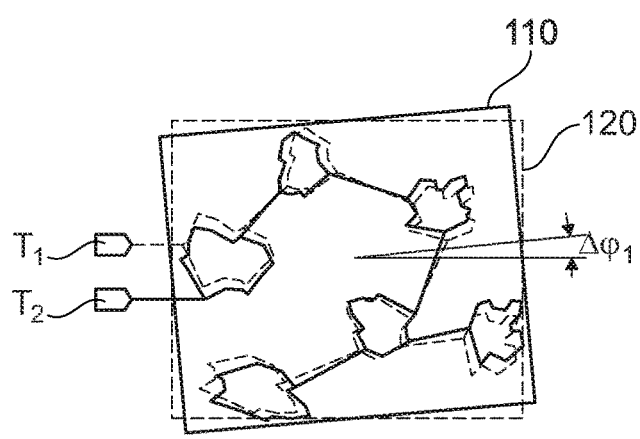
Figure 13:
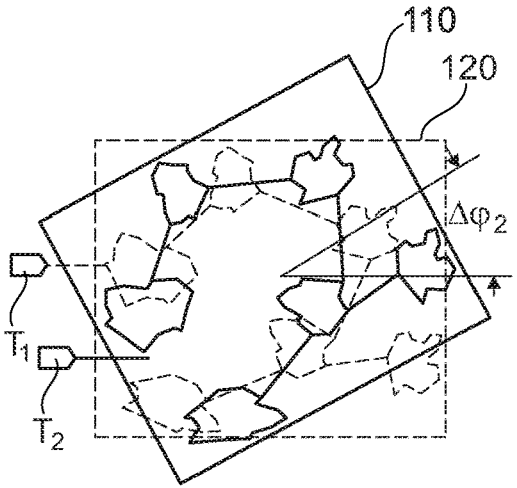

FIGS. 12 and 13 illustrate displacement restricted to a rotation by angle φ. If the total area $A_{tot}$ of the electrodes 110, 120 is limited, capacitance Cm can have a maximum at the un-tampered position P0/Pφ0. Capacitance Cm may have a minimum in case of infinite displacement from P0 to P1. In case of rotation, the maximum of capacitance Cm can be periodic with rotation by angles being an integer multiple of 360° (2π). If the total area $A_{tot}$ of the electrodes 110, 120 is limited, and if the length of the displacement vector is limited as well, it may be required to maximize the variation of capacitance Cm when displacing electrode 120 with respect to electrode 110.

FIGS. 14 to 20 illustrate electrode designs according to exemplary embodiments of the invention.

Figure 14:
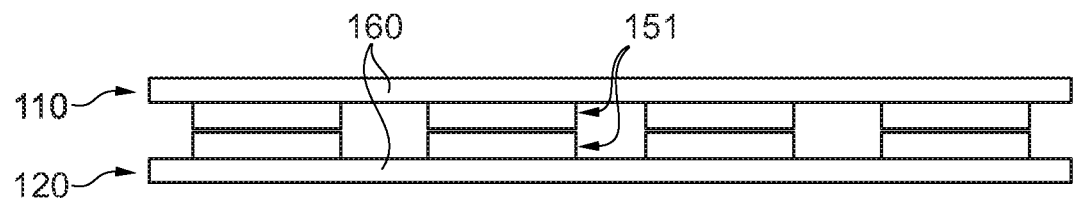
FIGS. 14 to 20 illustrate electrode designs according to exemplary embodiments of the invention.

FIG. 14: the first electrode 110 and the second electrode 120 each comprise a dielectric substrate 160, whereby the patterned structures are formed by electrically conductive material patterns 151 that are electrically coupled to each other (and formed as plates). The electrodes 110, 120 are separated by a distance d. While there is a high capacitance between the electrically conductive material patterned structures, the capacitance between electrically conductive material and dielectric substrate, or dielectric substrate and dielectric substrate, is very low.

Figure 15:
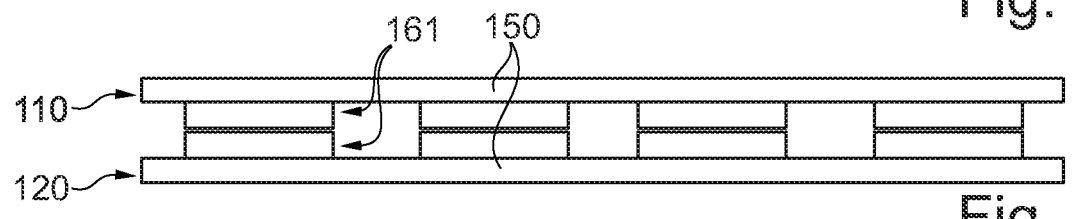

FIG. 15: the first electrode 110 and the second electrode 120 each comprises an electrically conductive substrate 150, whereby the patterned structures are formed by dielectric material patterns 161 (formed as plates).

Figure 16:
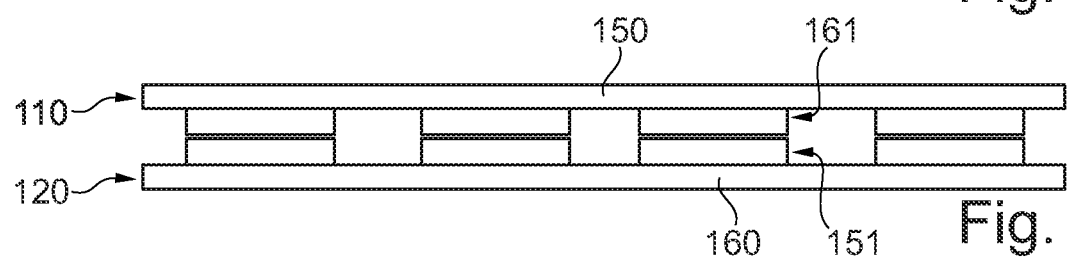

FIG. 16: the first electrode 110 comprises an electrically conductive substrate 150, while the second electrode 120 comprises a dielectric substrate 160. The first electrode 110 further comprises a patterned structure of dielectric material 161, while the second electrode 120 comprises a patterned structure of electrically conductive material 151 forming plates that are electrically coupled to each other.

Figure 17:
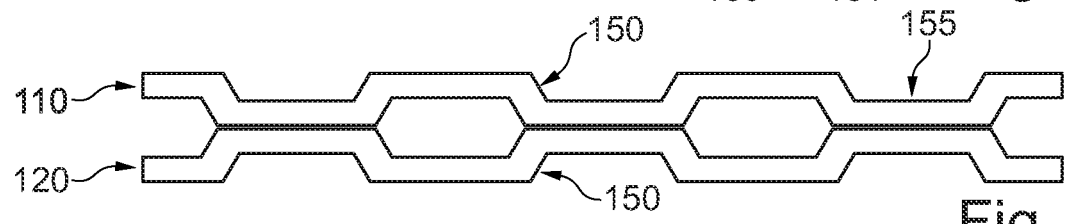

FIG. 17: the first electrode 110 and the second electrode 120 both comprise an electrically conductive substrate 150. The patterned structures are formed by embossing the substrate 150 in order to provide embossed structures 155. These embossed structures 155 provide in this example the patterned structure.

Figure 18:
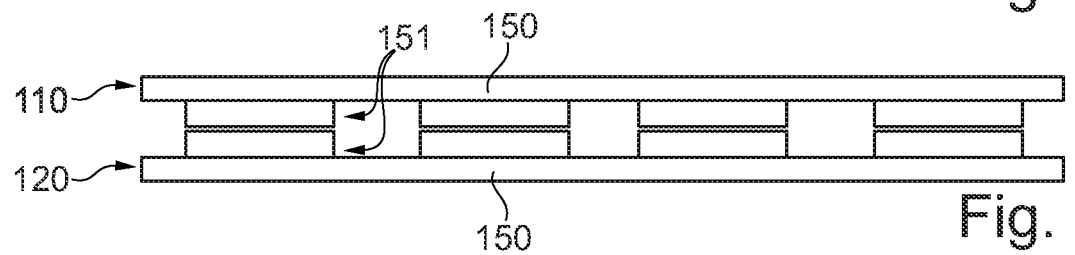

FIG. 18: the first electrode 110 and the second electrode 120 comprise electrically conductive substrates 150, respectively. Both patterned structures also comprise electrically conductive material 151 patterns. The first patterned structure is electrically coupled to the first electrode 110, and the second patterned structure is electrically coupled to the second electrode 120.

Figure 19:
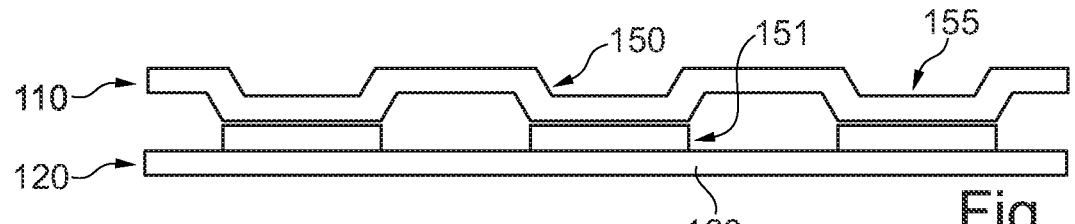

FIG. 19: the second electrode 120 comprises a dielectric substrate 160 and a second patterned structure of electrically conductive material 151, wherein the second patterned structure is electrically coupled to the second electrode 120. The first electrode 110 comprises an electrically conductive substrate 150 with an electrically conductive material pattern 151 connected with embossed structures 155.

Figure 20:
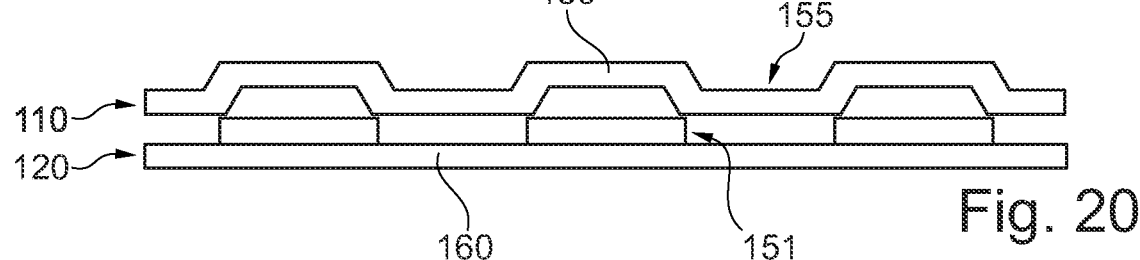

FIG. 20: shows an example of the first electrode 110 being configured for inverse correlation. In case of an embossed electrode, the first electrode 110 may just be flipped to change between correlation and inverse correlation. If the electrode distances between plates and between holes are kept the same for un-tampered and tampered electrode placement, the capacitance Cm may be minimal in un-tampered electrode arrangement in case of inverse correlation.

FIGS. 21 to 32 illustrate implementations of capacitance (variance) measurements according to exemplary embodiments of the invention.

FIG. 21 shows displacements of 0 . . . 3Δx. The variation of capacitance Cm may be 5:1. The configuration shown may be regarded as a sliding correlator performing correlation of the patterned structure of the first electrode 110 against an (essentially) identical/equal plate pattern of electrode 120. The patterns may be Gold codes having strong auto-correlation in un-tampered state and poor auto-correlation when being tampered. No correlation may occur if the Gold codes applied to the correlated electrodes simply do not match. In an example, compared to correlation known e.g. from spread-spectrum-receivers, the capacitive correlator considers only code positions for capacitance variation $Cm/Cm_{max}$ where each of the involved electrode shows conductivity.

FIG. 22 shows, for the configuration of FIG. 21, that due to correlation in un-tampered state (0 displacement), the correlation is for a specific electrode configuration (see e.g. FIG. 15) measured at least 3× larger than in tampered state (displacement 1 to 17).

FIG. 23 shows an example of an electrode 120 that has been extended by an exact copy of said electrode 120. Such periodicity occurs if displacement by rotation is to be detected. Characteristics of the Gold codes applied in the capacitive correlator are i) maximum capacitance Cm in case of un-tampered arrangement and of identical electrode patterns, ii) varying capacitance Cm (ripple) in case of tampered state and iii) a ratio of capacitance Cm at un-tampered arrangement to peak capacitance in tampered state. The auto-correlation efficiency (correlation quality factor) may be expressed by the ratio of capacitance at un-tampered state to the theoretical capacitance that a code comprising only "1"s of the same bit-length as the Gold code would provide (see column "variation" in FIG. 24 below).

FIG. 24 shows some Gold codes with their key parameters that may provide good auto-correlation performance in capacitive correlators. The Gold code's bit length may define the linear/angular resolution, the code's efficiency may be defined by the number of "1"s (high capacitance states), and the code sequence itself may impact the ripple in tampered state.

Figure 25:
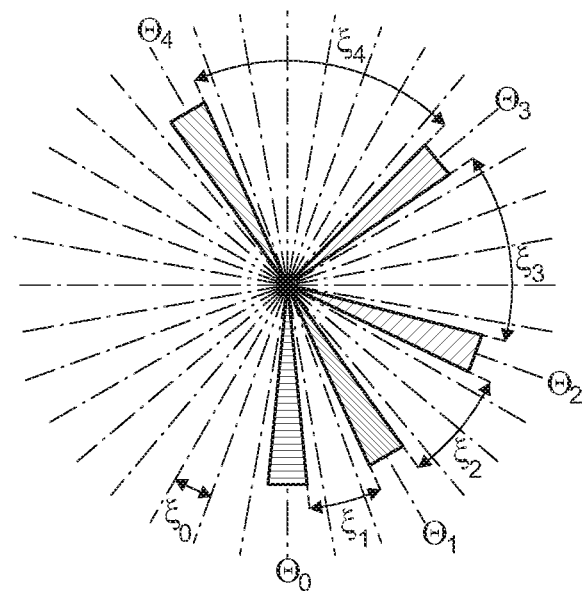
Figure 26:
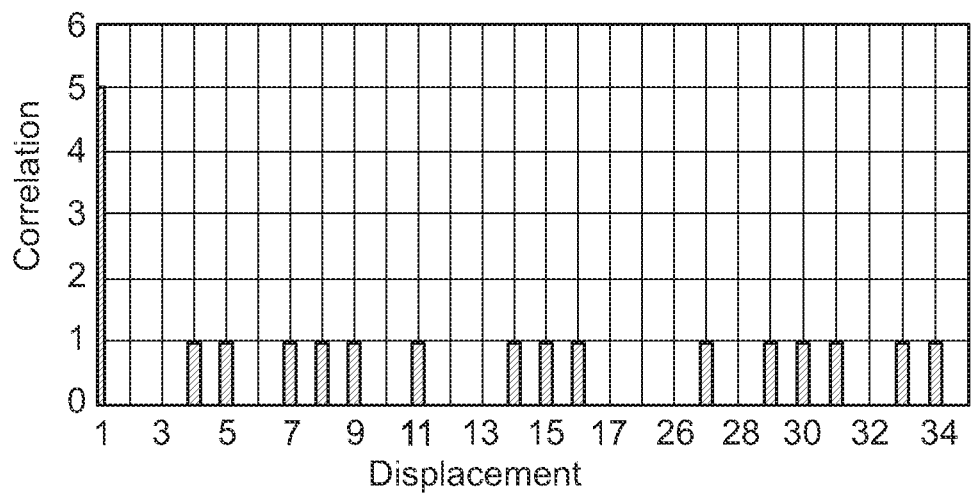
Figure 27:
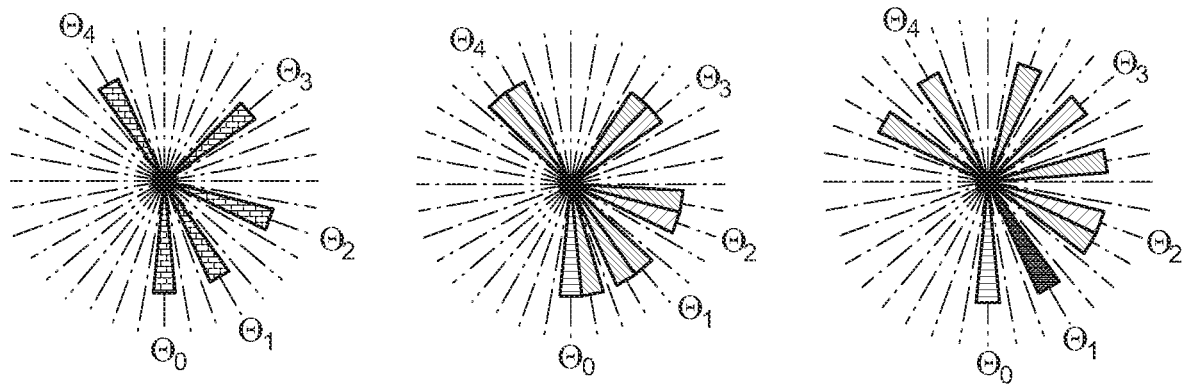

FIG. 25 illustrates the principle described above applied to a rotational displacement. The related correlation diagram for electrode configuration, as shown by FIG. 22, is shown in FIG. 26. FIG. 27 shows the correlator described above for different displacement angles.

Figure 28:
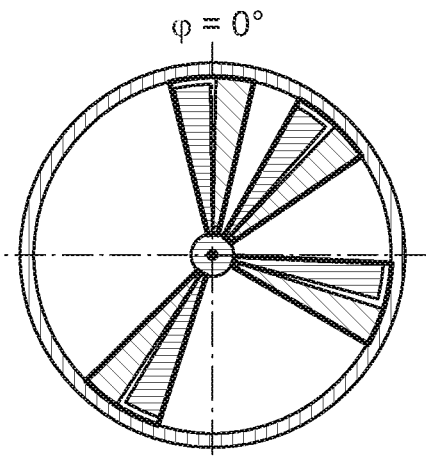
Figure 29:
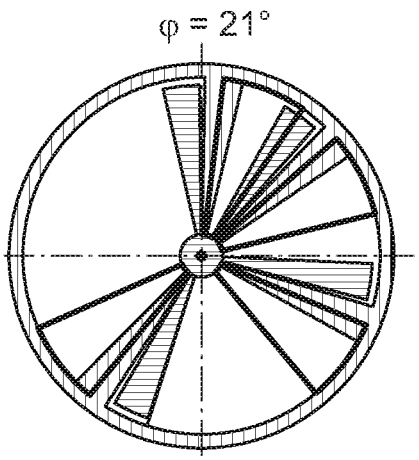
Figure 30:
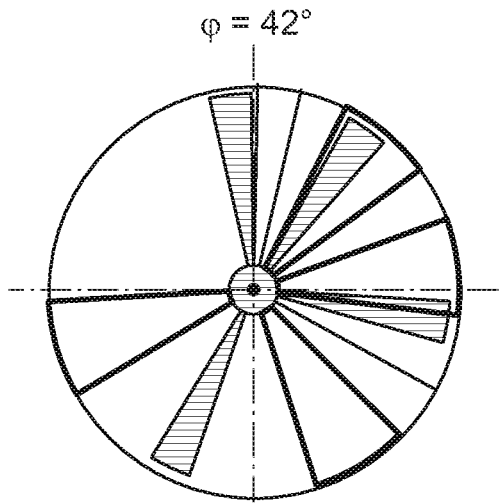
Figure 31:
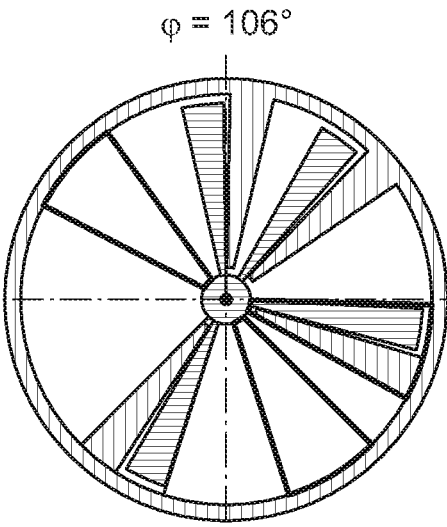

FIG. 28 shows that capacitance Cm and Cc may have their maximum at un-tampered placement with $\varphi=0°$. As shown by FIG. 29, the measured capacitance Cm' may have a minimum of $Cm' \ll (Cm_{max}'/4)$. As shown by FIG. 30, the measured capacitance Cm' is around $Cm_{max}'/4$. As shown by FIG. 31, the measured capacitance is $Cm'=(Cm_{max}'/2)$, resulting in a variation of Cm' between un-tampered position and rotated (tampered) position by 2:1.

Figure 32:
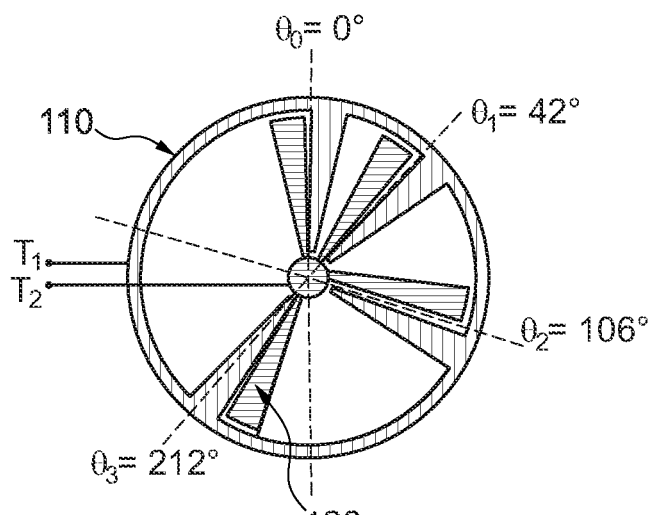
Figure 32:
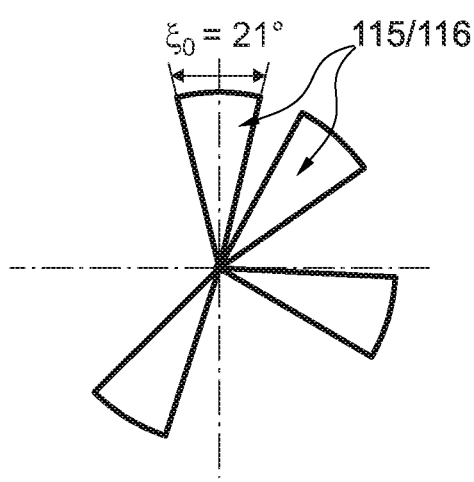

FIG. 32 shows an embodiment with m0=m1=1, p1=2, p2=5, p3=9, p4=17 and $\xi 0=21.2°$ (segment width $\xi 0$ not scaled correctly for better visibility, m0 is area multiplier, m1 is area multiplier factor, see FIG. 34 below).

Figure 33:
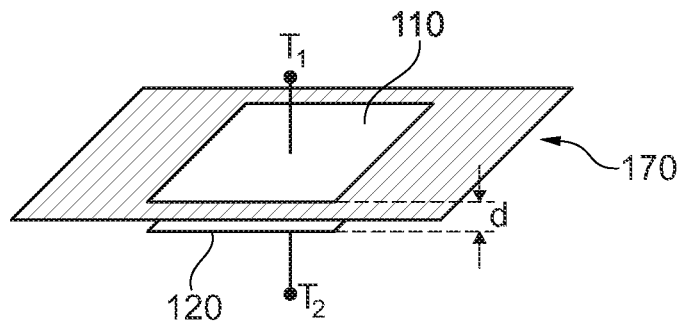
FIGS. 33 to 38 illustrate implementations of spatially separated electrode parts according to exemplary embodiments of the invention.

FIG. 33 illustrates a capacitor formed by the first electrode 110 and the second electrode 120. One of the electrodes may be difficult to contact if one of the terminals T1 or T2 resides beyond a packaging 170 boundary where it may not be interconnected. This may e.g. be the case for bottle closings.

Figure 34:
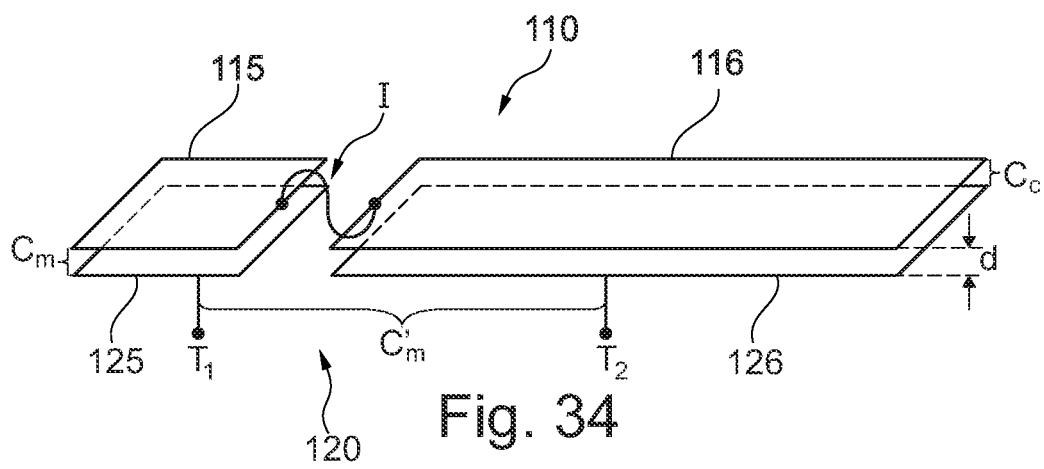

FIG. 34 illustrates an exemplary embodiment to solve the problem described above. The first electrode 110 comprises a first electrode part 115 and a second electrode part 116, wherein the first electrode part 115 and the second electrode part 116 are interconnected by an interconnection I. The second electrode 120 comprises a third electrode part 125 connected to a first terminal T1 and a fourth electrode part 126 connected to a second terminal T2. The first electrode part 115 is arranged opposite to the third electrode part 125 and the second electrode part 116 is arranged opposite to the fourth electrode part 126. Thus, a packaging 170 (boundary) is placeable between the first electrode 110 and the second electrode 120, while both terminals T1, T2 are accessible from one common side of the packaging 170. In other words, to solve the problem indicated above, it may be required to split electrodes forming capacitance Cm into an electrode part comprising electrode parts 115 and 125, and an electrode part comprising electrode parts 116 and 126, wherein electrode parts 125 and 126 are accessible from one side of the packaging boundary that can e.g. be inside a packaging 170 boundary, while the first electrode 110, comprising coupled electrode parts 115 and 116, may reside on the opposite side of the packaging boundary that may e.g. be outside of a package 170 boundary and may thus not be accessible by interconnection. Thus, the capacitance Cm' now formed by electrode parts 115 and 125 may be capacitively coupled through the capacitance formed by electrode parts 116 and 126. In one embodiment, an area multiplier factor m1 may be chosen large enough to make capacitance Cm dominant for the measured capacitance Cm'. For e.g. m1=10*m0, capacitance Cm' may be measured through terminals T1 or T2 with neglectable error.

Figure 35:
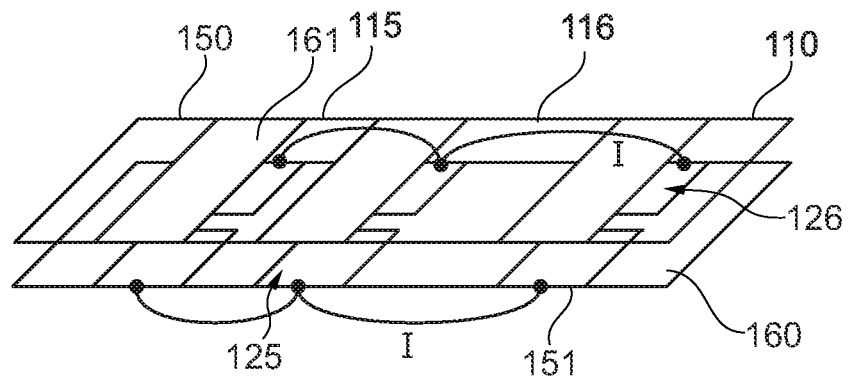

FIG. 35 illustrates a further embodiment of the example described above, wherein an electrically conductive substrate 150 with a dielectric material pattern 161 is used for the first electrode 110 with a first sub-electrode part 115 and a second sub-electrode part 116 being electrically coupled to the first sub-electrode part 115. A dielectric substrate 160 is used for the second electrode 120 comprising the third sub-electrode part 125 and the fourth sub-electrode part 126. The sub-electrode parts 125 and 126 are formed by electrically conductive material patterns 151. The terminals of sub-electrode parts 125 and 126 are accessible from the same plane, while the first electrode 110 is positioned on another plane not being accessible from said plane. A benefit of this embodiment is that the first electrode 110 may e.g. be applied by printing dielectric ink of high permittivity on a conductive substrate that may e.g. be aluminum foil, making manufacturing of the first electrode 110 compatible with standard tooling being available at packaging manufacturers. Moreover, this embodiment may provide the benefit, that the conductive substrate may act as a shield against electromagnetic coupling into the CMU.

Figure 36:
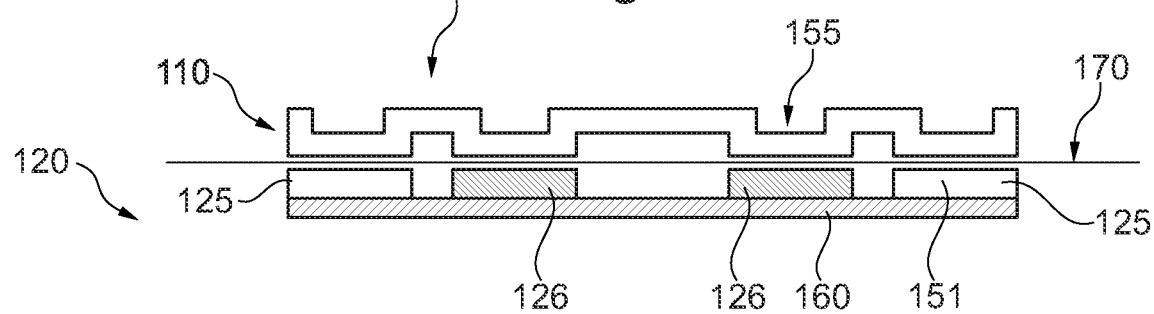

FIG. 36 illustrates an exemplary embodiment, wherein the third electrode part 125 comprises an outer electrode part, wherein the fourth electrode part 126 comprises an inner electrode part, and wherein the outer electrode part surrounds the inner electrode part. The second electrode 120 comprises a dielectric substrate 160 and the third 125 and fourth 126 electrode parts that are structured by a electrically conductive material patterns 151. The first electrode 110 is made of electrically conductive material 150 which comprises embossed structures 155. A packaging 170 is arranged between the electrodes 110, 120.

Figure 37:
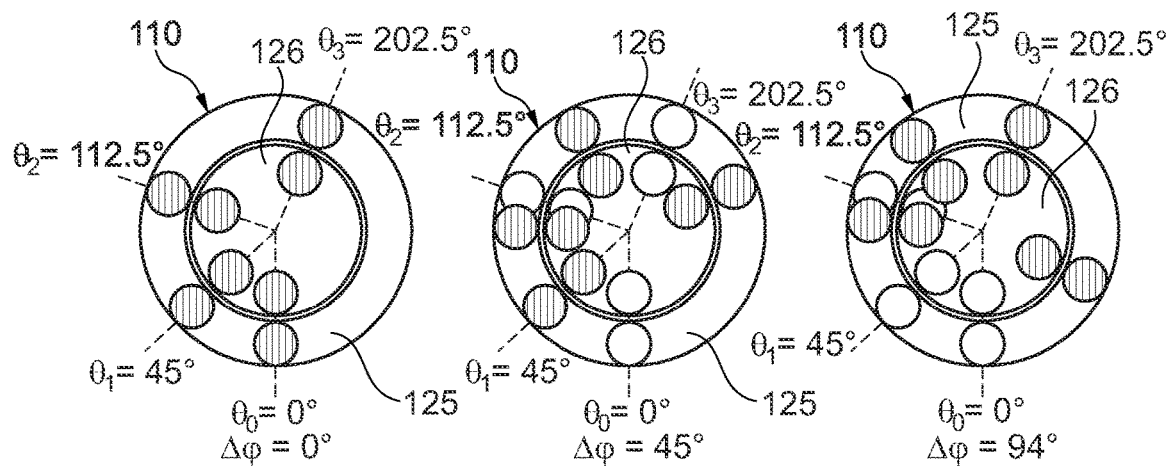
Figure 38:
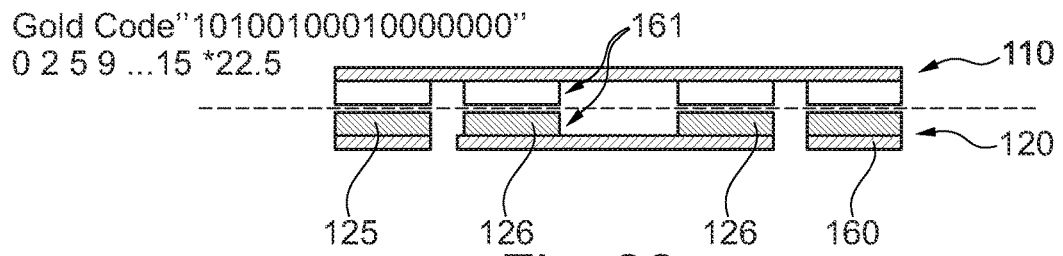

FIG. 37 illustrates an embodiment of a displacement detector for angular displacement applying the principles laid out by FIGS. 34 to 36 above. In this specific configuration, the device comprises a "floating metal disc" electrode 110, and a counter electrode 120 comprising an outer metal ring electrode 125 and an inner metal disc electrode 126. The Gold code "10100100010000000" may be encoded (patterned) by dots of dielectric material 161 being applied to the electrodes 110, 120 as shown by FIG. 38, wherein patterns of the patterned structures must be aligned. The angular resolution in this embodiment may be 22.5°. The capacitive correlator at different angular displacements ($\Delta\varphi=0°$, $\Delta\varphi=45°$, $\Delta\varphi=94°$) is shown.

Figure 39:
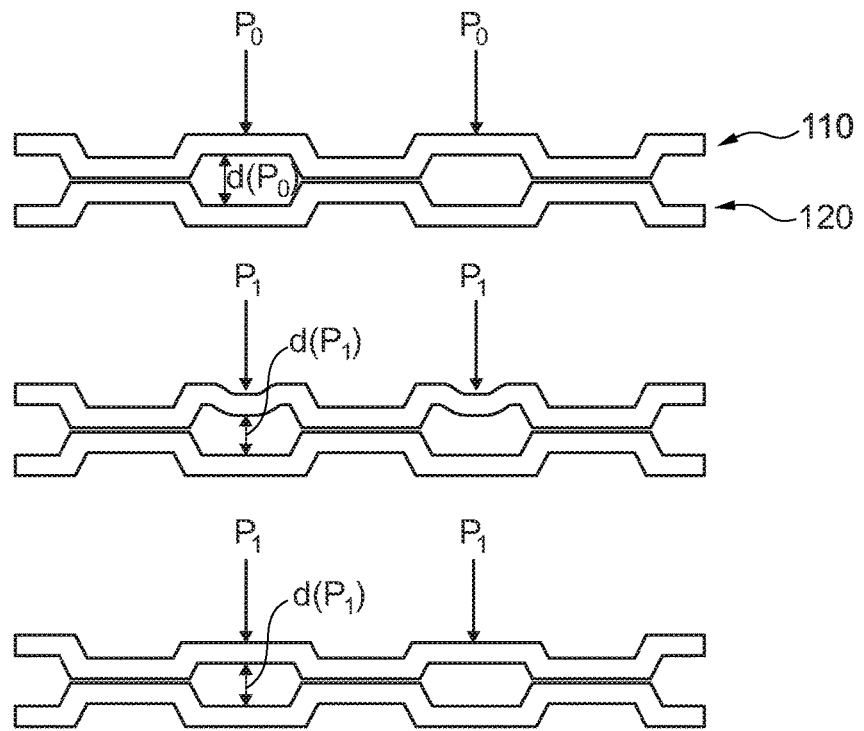
FIG. 39 illustrates a use of the tamper detection device as a pressure sensor according to an exemplary embodiment of the invention.

FIG. 39 illustrates the use of the device 100 as a pressure sensor. Applying pressure P0 to the component carrying electrode 110 and aligning the electrodes 110, 120 with a high-level correlation, results in areas of high capacitance and areas of lower capacitance forming the measured overall capacitance. Applying pressure to electrode 110 results in mechanical deformation of the raised sections forming the correlation pattern on the electrode, thus decreasing the distance d between the electrodes 110, 120 in the sections of lower capacitance. A decreased distance d results in a higher capacitance, thus the overall measured capacitance increases as a function of pressure, with P0 being the initially applied pressure.

Figure 40:
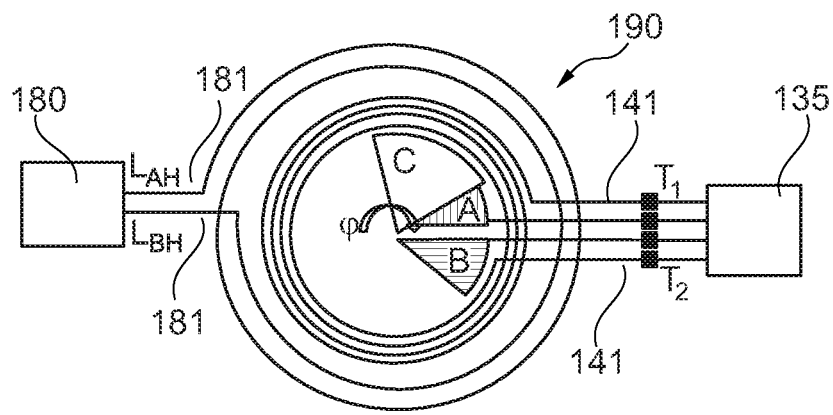
FIGS. 40 to 43 illustrate detailed configurations of the loop antennas according to exemplary embodiments of the invention.

FIG. 40 illustrates a schematic view of a tamper detection system 190, comprising a tamper detection device 100 being operatively coupled by means of a loop antenna 141, and loop antenna 181 to a data processing external device 180 (compare FIG. 1).

Figure 41:
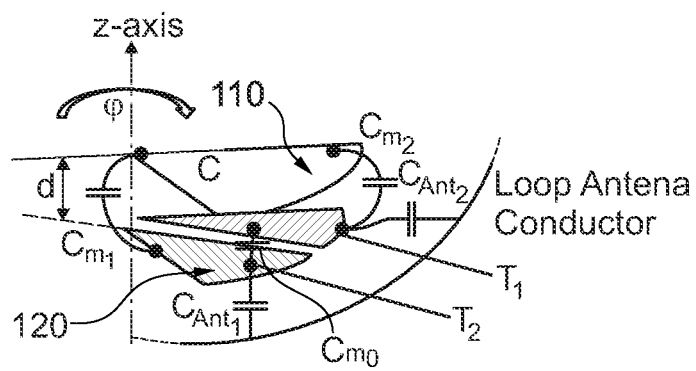

FIG. 41 illustrates a more detailed view, wherein capacitances Cm0, Cm1, and Cm2 are capacitance components of capacitance Cm being indicative for displacement and thus for tampering. $C_{ant1}$ and $C_{ant2}$ denote parasitic coupling capacitances from e.g. the loop antenna 141 to electrodes 110, 120. In more detail, Cm0 denotes the displacement independent direct plate coupling capacitance between electrodes 110, 120. Capacitance Cm may be measured by a Capacitance Measurement Unit (CMU).

Figure 42:
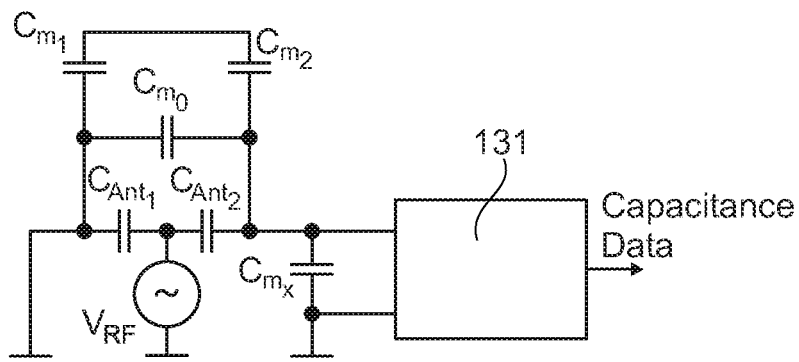

FIG. 42 illustrates that a noise source $V_{RF}$ may couple an RF noise component capacitively to the CMU's 131 input. Embodiments as e.g. of FIG. 37 may have a positive impact on shielding against noise originating from the loop antenna, as the metal disc electrodes as well as the ring electrode may act as a short circuit for the noise: at coupling positions along the loop antenna the phase of the coupled noise may constantly vary from 0° to 360°, thus yielding strong noise attenuation. In case of external EM radiation, the electrode configuration also provides shielding, and the present inter-electrode capacitance adds to capacitance Cmx, thus further contributing to noise attenuation.

Figure 43:
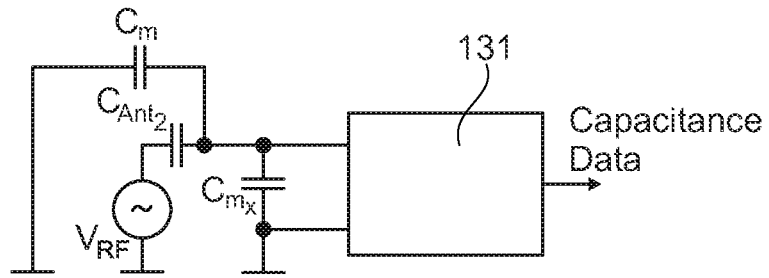

FIG. 43 illustrates a simplified view of the configuration shown above, wherein the components of capacitance Cm are not split up, capacitance $C_{an1}$ has been neglected as it is connected in parallel to low impedance voltage source VRF and may not contribute to noise attenuation. To attenuate noise components coupling from VRF, a capacitance Cmx may be coupled in parallel to the capacitance components of Cm. Making Cmx large compared to the coupling capacitance $C_{ant2}$ may effectively attenuate coupled noise components of VRF. Such noise attenuation may be combined with electrodes being structured by printed insulation layers on conductive substrates as e.g. of FIG. 37.

REFERENCE NUMERALS

100 Tamper detection device
110 First electrode
111 First patterned structure
115 First part
116 Second part
120 Second electrode
121 Second patterned structure
125 Third part
126 Fourth part
130 Detection unit
131 Capacitance measurement unit
132 Correlation unit
135 Position correlation module
136 Power unit
140 Communication unit
141 First loop antenna
150 Electrically conductive substrate
151 Electrically conductive material/pattern
155 Embossed electrically conductive structure
160 Dielectric substrate
161 Dielectric material/pattern
170 Packaging
180 External unit
181 Second loop antenna
182 External communication unit
183 Data processing unit
190 Tamper detection system
Cm Capacitance maximum
I Interconnection
P Pressure
T1, T2 First terminal, second terminal

The invention claimed is:

1. A tamper detection device for detecting tampering with respect to a packaging, wherein the device comprises:
a first electrode comprising a first patterned structure;
a second electrode comprising a second patterned structure;
wherein the first electrode and the second electrode are arranged so that the first patterned structure and the second patterned structure are at least partially opposite to each other,
wherein, in a first arrangement state of the first patterned structure and the second patterned structure with respect to each other, a first capacitance is measurable,
wherein, in a second arrangement state of the first patterned structure and the second patterned structure with respect to each other, a second capacitance is measurable, wherein the first capacitance is different from the second capacitance, and wherein the first arrangement state is different from the second arrangement state; and a detection unit, wherein the detection unit is configured to:

measure the capacitance between the first electrode and the second electrode, obtain, based on the measured capacitance, an information indicative of the arrangement state, and evaluate, based on the information indicative of the arrangement state, if a tampering with respect to the packaging is detected, wherein tampering is not detected when the first patterned structure and the second patterned structure are in the first arrangement state wherein a high level of correlation between the first patterned structure and the second patterned structure is obtained, and wherein tampering is detected when the first patterned structure and the second patterned structure are in the second arrangement state wherein a low level of correlation between the first patterned structure and the second patterned structure is obtained, and wherein the measured capacitance is at its maximum or at its minimum in the first arrangement state, and wherein the measured capacitance is not at its maximum or at its minimum in the second arrangement state.

2. The tamper detection device according to claim 1, wherein the information indicative of the arrangement state is based on a capacitance variation caused by a displacement and/or a rotation of the electrodes with respect to each other.

3. The tamper detection device according to claim 1, wherein the pattern of the first patterned structure and the pattern of the second patterned structure are essentially identical.

4. The tamper detection device according to claim 1, wherein the first patterned structure and/or the second patterned structure comprises a Gold code pattern.

5. The tamper detection device according to claim 1, wherein the first electrode and/or the second electrode comprises at least one of the following features:

a plurality of spatially separated electrically conductive material patterns;

a plurality of spatially separated dielectric material patterns;

a plurality of spatially separated electrically conductive material patterns on a dielectric substrate, and/or a plurality of spatially separated dielectric material patterns on an electrically conductive substrate;

a plurality of spatially separated electrically conductive material patterns on an electrically conductive substrate;

a plurality of spatially separated electrically conductive material patterns formed as embossed structures on an electrically conductive substrate.

6. The tamper detection device according to claim 1, wherein the first electrode comprises a first electrode part and a second electrode part, wherein the first electrode part and the second electrode part are interconnected;

wherein the second electrode comprises a third electrode part connected to a first terminal and a fourth electrode part connected to a second terminal;

wherein the first electrode part is arranged essentially opposite to the third electrode part;

wherein the second electrode part is arranged essentially opposite to the fourth electrode part; and wherein the device is configured so that a packaging is placeable between the first electrode and the second electrode, while both terminals are accessible from one side of the packaging.

7. The tamper detection device according to claim 6, wherein the third electrode part comprises an outer electrode part, wherein the fourth electrode part comprises an inner electrode part, and wherein the outer electrode part surrounds the inner electrode part.

8. The tamper detection device according to claim 1, further comprising:

a communication unit coupled to the detection unit, wherein the communication unit is configured to communicate, in particular in a wireless manner, with an external device; and send a detection result to the external device.

9. The tamper detection device according to claim 1, wherein the tamper detection device is configured to communicate a tampering detection result with an external device.

10. The tamper detection device according to claim 9, comprising at least one of the following features:

wherein the communication with the external device is at least one of the group consisting of NFC, Bluetooth, RFID, WiFi, Zigbee;

wherein the tamper detection device is configured to wirelessly receive energy from the external device; and wherein the external device is configured to request the tampering detection result from the device.

11. The tamper detection device according to claim 1, wherein the tamper detection device is configured to detect tampering of a product's packaging.

12. The tamper detection device according to claim 1, the method comprising:

an electrically conductive preform, in particular a foil, having at least two electrodes;

wherein the electrodes are patterned to provide respective patterned structures;

wherein the patterned structures are formed by at least one of application and/or removal of electrically conductive material to/from the preform, application and/or removal of dielectric material to/from the preform, and embossing, at least partially, the preform.

13. A method for detecting tampering with respect to a packaging by a tamper detection device that has a first electrode comprising a first patterned structure and a second electrode comprising a second patterned structure, the method comprising:

arranging the first electrode and the second electrode so that the first patterned structure and the second patterned structure are at least partially opposite to each other, wherein, in a first arrangement state of the first patterned structure with respect to the second patterned structure, a first capacitance is measurable, wherein, in a second arrangement state of the first patterned structure with respect to the second patterned structure, a second capacitance is measurable, wherein the first capacitance is different from the second capacitance, and wherein the first arrangement state is different from the second arrangement state;

measuring a capacitance between the first electrode and the second electrode;

obtaining, based on the measured capacitance, an information indicative of the arrangement state; and evaluating, based on the information indicative of the arrangement state, if a tampering with respect to the packaging is detected, wherein tampering is not detected when the first patterned structure and the second patterned structure are in the first arrangement state wherein a high level of correlation between the first patterned structure and the second patterned structure is obtained, and wherein tampering is detected when the first patterned structure and the second patterned structure are in the second arrangement state wherein a low level of correlation between the first patterned structure and the second patterned structure is obtained, and wherein the measured capacitance is at its maximum or at its minimum in the first arrangement state, and wherein the measured capacitance is not at its maximum or at its minimum in the second arrangement state.

14. The method according to claim 13 wherein the method is used to provide at least one of a security seal, protection of a device, an access control to a function or service, a ticket, and a pressure sensor.

\* \* \* \* \*